Oct. 17, 1944.   H. L. CONRAD   2,360,762
MOTION TRANSFORMING DEVICE
Filed July 5, 1943
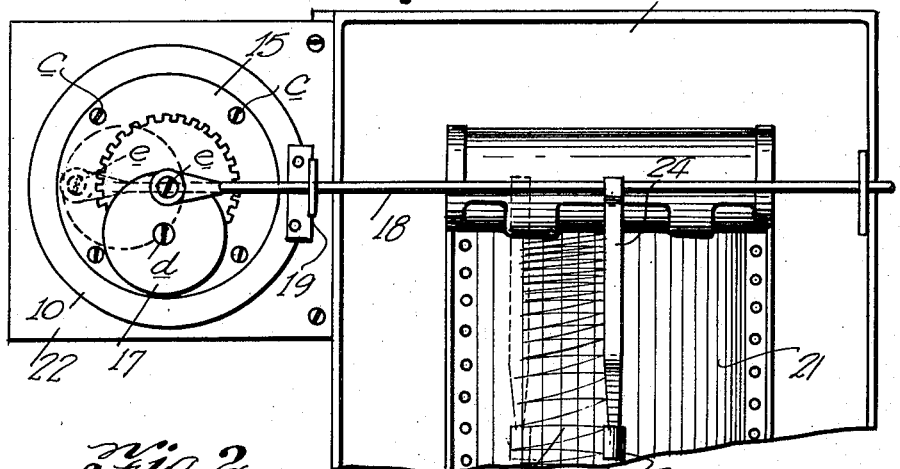
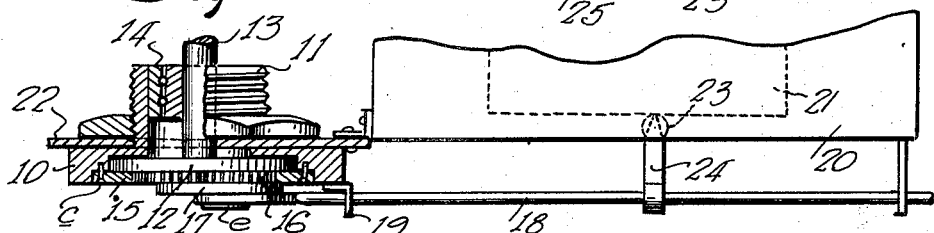
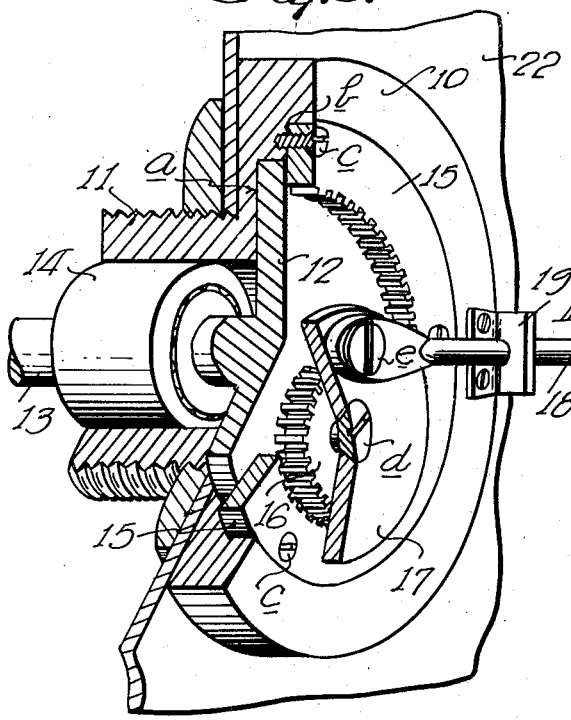
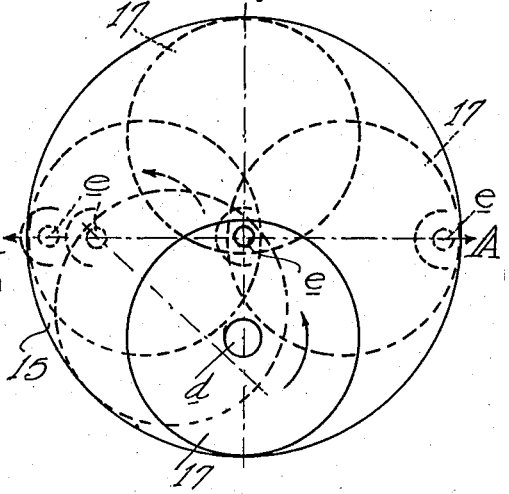
HAROLD L. CONRAD
INVENTOR.
BY
ATTORNEY Patented Oct. 17, 1944

2,360,762

UNITED STATES PATENT OFFICE 2,360,762

MOTION TRANSFORMING DEVICE

Harold L. Conrad, Oklahoma City, Okla.

Application July 5, 1943, Serial No. 493,547

3 Claims. (Cl. 74—52)

This invention relates to transmission mechanisms and it has particular reference to a new and novel device by which a rotative force is transformed into a reciprocative action.

The principal object of the invention is to provide a compact assembly of parts including a driven shaft carrying a disc to which is pivoted a small gear, the latter being constrained to travel in a circular fashion by reason of its epicyclic relationship with an internal gear and to the small gear is pivoted a second disc which in turn has a shaft eccentrically connected to its face, the combination being designed and arranged to constrain said shaft to travel in an undeviatingly straight line.

Another object of the invention is to provide a transmission mechanism particularly useful in performing certain important functions such as operating the scribing means on recording charts and other adaptations within its range of operation.

With the foregoing objects as paramount, the invention has particular reference to certain features of accomplishment, to become manifest as the description proceeds, taken in connection with the accompanying drawing, wherein:

Figure 1 is a front elevational view of a transmission mechanism constructed according to the present invention showing its adaptation to a recording mechanism.

Figure 2 is a plan view in transverse section.

Figure 3 is a perspective view of the invention per se with portions broken away, and Figure 4 is a partially developed pattern showing the progressive circular travel of the disc which actuates the reciprocable arm.

Continuing with a more detailed description of the drawing, reference is primarily made to Figure 3 wherein 10 denotes a circular case having an integral, exteriorly threaded sleeve 11 extending from its rear face. The front face of the case is annularly recessed to define a circular cavity $a$ and an annular ledge $b$.

Lying in snug conformity within the circular cavity $a$ is a disc 12, provided with a stem or shaft 13 which extends concentrically through the sleeve 11 of the case 10 and is embraced by a bearing 14, the outer race of which is fitted snugly into the sleeve 11. Sufficient clearance is afforded between the surfaces of the disc 12 and the walls of the cavity $a$ to insure against frictional resistance and much of the friction which remains is overcome by proper lubrication.

Mounted within the cavity $a$ and secured to the annular ledge $b$ by countersunk screws $c$ is an internally toothed ring 15. A portion of the ring 15 overlies the disc 12 and, in fact, secures the latter against forward thrust.

A small gear or pinion 16 is mounted on the face of the disc 12 and whose rotating axis $d$ is in off-centered relationship with the axis of the disc 12 so that it will be constrained to travel in a circular fashion about the axis of the disc 12 when the latter is rotated and since its teeth are enmeshed with those of the ring 15 it will revolve as it so travels.

A second and smaller disc 17 is fixedly mounted on the axis $d$ of the gear 16 and has eccentrically pivoted thereto at $e$, an arm 18. This arm is passed through and operates in an aperture in a bracket 19, affixed to a stationary part of the assembly, such as the case 10, as shown.

In Figure 4 is shown a partially developed pattern of the various positions assumed by the disc 17 in its travel about the rotating axis of the disc 12. It is apparent from this illustration that as the shaft 13 is operated by a motor, belt or other means, not shown, the disc 12 will rotate in the cavity $a$ and since the gear 16 is pivoted eccentrically to this disc, it will travel about the center thereof and being enmeshed with the teeth of ring 15, it will also rotate. The smaller disc 17, being secured to the gear 16, it will follow the circular path thereof and likewise rotate. The ratio of travel between the disc 17 and the disc 12 together with the relative dimensions of these parts insures that the pivot point $e$ of the arm 18 will not change its position relative to a diametrical line through the pattern such as indicated at A—A in Figure 4. Accordingly, as the disc 17 moves in an epicyclic path about the center of disc 12, the arm 18 will be reciprocated to perform any function desired within its range of operation.

In Figures 1 and 2 is shown one adaptation of the invention, that of actuating the stylus arm of a recording apparatus, the latter consisting of the housing 20 within which operates a chart 21. As shown, the invention is supported by a mounting plate 22 so that the arm 18 will extend over the face of the chart 21. A stylus 23 is mounted on the stylus arm 24, the latter, in turn, being mounted on the arm 18 of the invention.

It is apparent from the foregoing that as the device of the invention is operated, the arm 18 is reciprocated to cause the stylus 23 to travel back and forth within specified limits on the chart 21, producing the zig-bag line 25 shown in Figure 1. The resulting graph may be used in relation to time, for example, in calculating footage drilled and the time required for such drilling in oil field work.

It is understood, however, that the foregoing suggests only one adaptation of the invention and that the latter is not limited thereto. Moreover, certain changes and modifications in the construction shown may be made from time to time as may be found desirable or necessary without departing from the spirit or intent of the invention as set forth in the following claims.

What is claimed is:

1. A device for transforming rotary to reciprocating motion comprising an annularly recessed case having a hollow, exteriorly threaded extension, a retaining nut on said extension, a shoulder formed about the edge of said recess, a disc lying within said recess and having a stem disposed concentrically in the hollow extension of said case, a toothed ring affixed to the shoulder of said recess whose teeth overreach the edge of said disc, a gear pivoted to said disc in offset relation to its axis and engaging the teeth of said ring, a second disc affixed to the axis of said gear and a pitman eccentrically pivoted to said second disc and reciprocated longitudinally upon rotation of the stem of said first disc.

2. In a device for imparting reciprocative motion to a work performing member from a rotating shaft, the combination comprising a case having an annularly recessed face and a hollow, exteriorly threaded extension embracing said shaft, a nut on said extension for holding said case on a support, a disc formed on one end of said shaft and lying snugly within said recess, a toothed ring affixed to said case whose teeth overreach the edge of said disc to hold the latter against displacement, a gear pivoted to said disc in offset relation to its axis and a pitman having one end eccentrically connected to said gear and guided intermediate its ends and constrained to move longitudinally upon rotation of said shaft.

3. In a device for transforming rotative to reciprocative motion, the combination comprising a case having a hollow extension for its retention on a support and further provided with an annular recess in its opposite face, a disc rotatably confined in said recess and provided with an operating shaft disposed concentrically in said extension, a gear ring affixed to said case having its toothed inner edge overlying the edge of said disc as a retaining means, a gear eccentrically pivoted to the face of said disc and engaging the teeth of said ring and a pitman constrained intermediate its ends against other than longitudinal movement and having one end eccentrically pivoted to said gear whereby rotation of said shaft will effect reciprocation of said pitman.

HAROLD L. CONRAD.